July 2, 1935. J. H. RICH 2,006,874
PRUNING IMPLEMENT OR TOOL
Filed April 17, 1934
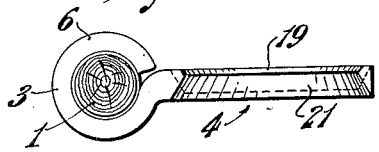
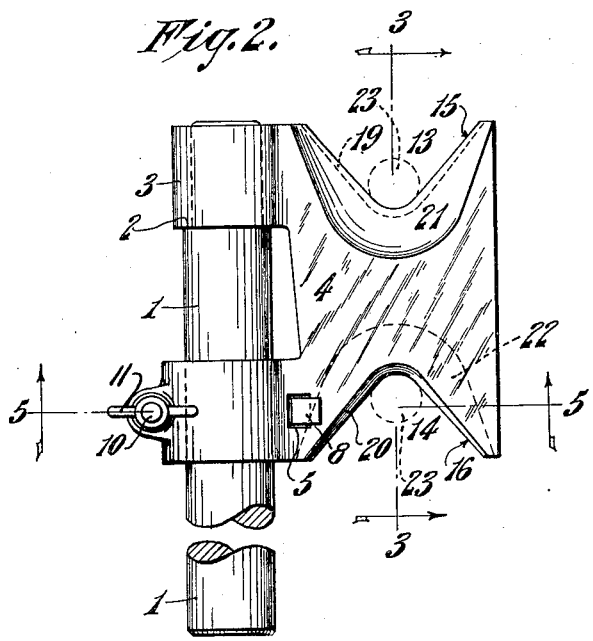
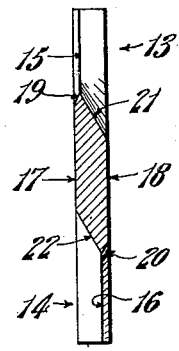
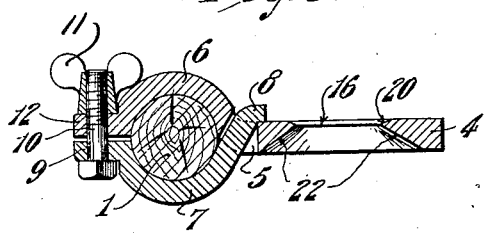
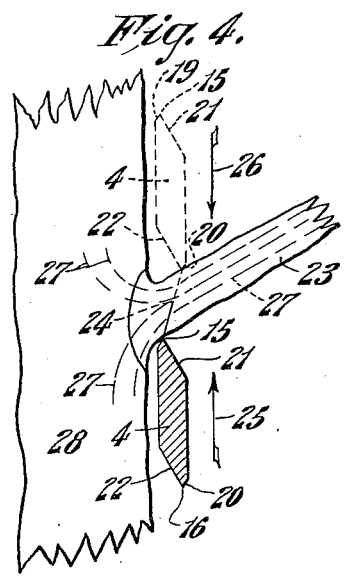
INVENTOR,
Joseph Harry Rich,
BY
Harry W. Bowen.
ATTORNEY.

Patented July 2, 1935

2,006,874

UNITED STATES PATENT OFFICE 2,006,874

PRUNING IMPLEMENT OR TOOL

Joseph Harry Rich, Stoneham, Mass.

Application April 17, 1934, Serial No. 720,998

2 Claims. (Cl. 30—11)

This invention relates to improvements in pruning implements or tools for removing a limb, or branch, from a tree without the possibility of the limb, when it is being severed, peeling or stripping the bark on the trunk or side of the tree.

Heretofore, it has been a common practice to employ a saw, or other tool for pruning with the result that oftentimes a limb, when partially severed, will, when it falls downward, strip or tear the bark from the side of a tree, thus injuring it.

It is, therefore, an object of my improvement in pruning tools to provide an implement for overcoming these objections and rapidly and carefully severing a limb, without injuring the tree in any way.

Another object is to provide a pruning implement which will leave a clean and smooth surface when the limb is removed. This is very necessary for the reason that as the trunk of the tree grows and increases in size and reaches a size suitable for use as a saw log, there will not appear a knot in the finished board, or, at the most, only a very small one.

Broadly, my invention comprises an implement having a blade that is formed with a notch or recess in its upper and lower edges, each one of which is sharpened. These notches are substantially V-shaped, with the apex portion curved. The sharpened edges of these notches are so arranged, with reference to the sides of the blade, that the implement, when in use, will operate so as to leave a clean cut or surface on the side of the tree.

My invention further relates to the means, or structure, of attaching the blade to an operating rod, or handle. A further object is to provide a pruning tool that will cut close to the trunk.

These, and other objects and advantages will appear in the body of the specification with reference to the accompanying drawing and appended claims.

Referring to the drawing:—

Fig. 1 is a top, plan view of the tool or implement.

Fig. 2 is a side, elevational view of the implement, showing the notches or recesses in the upper and lower edges of the blade both of which have a sharpened edge, also, a portion of the handle.

Fig. 3 is a vertical, sectional view on the line 3—3 of Fig. 2, illustrating the location of the cutting edges.

Fig. 4 shows how the implement is used in practice for pruning purposes, and

Fig. 5 is a sectional view on the line 5—5 of Fig. 2, showing the manner of attaching the blade to the operating rod.

Referring to the drawing in detail:—

I designates the supporting pole, or handle, which is formed with the shouldered portion 2 at its upper end on which rests the bent portion 3 of the metal blade 4 which, as shown, is located at the upper end of the blade. The lower end of the blade is formed with a lateral opening 5 and a semi-circular integral part 6. 7 indicates a substantially semi-circular clamping member having a bent end 8 which is placed in and extends through the opening 5, its opposite end being formed with a flange 9 and an opening to receive the clamping bolt 10 on which is placed the wing nut 11 that engages the flange 12 of the semicircular part 6, whereby the blade 4 may be firmly clamped and secured to the pole 1.

The blade 4 is formed with the oppositely located V-shaped recesses 13 and 14 in its upper and lower edges, the apex of each being curved. These recesses are ground or sharpened to form the cutting edges, shown at 15 and 16. It will be observed that these cutting edges are not located in a plane that is centrally disposed; that is to say, one whose location would be an equal distance from the opposite faces 17 and 18, but are so located that they are near the opposite faces, or sides, 17 and 18, as shown. This is brought about by forging or cutting away the small portions 19 and 20 and the larger portions 21 and 22. The sides 19 and 21, on either side of the cutting edge 16, are ground at approximately the same angle, and, as the surfaces 21 and 22 are longer than the surfaces 19 and 20, the cutting edge 15 is located nearer to the face 17 than to the face 18, and the cutting edge 16 is located nearer to the face 18 than to the face 17. The purpose of so locating these cutting edges, in an inclined plane, is to produce a clean and smooth surface where the limb 23 is severed, as indicated by the line 24 in Fig. 4.

The implement or pruning tool is used as follows: The blade 4 is first moved upward in the direction of the arrow 25 bringing the sharpened recess 13 against the lower side of the limb 23 to cut the bark on this side of the limb and partially sever the limb itself. Next, the operator places the lower, sharpened recess 14 on the upper side of the limb and moves it downward, as shown by the arrow 26. The result of these two movements of the blade 4 is to sever the limb 23 on the inclined line 24, which leaves a clean cut and smooth surface. This clean cut is brought about, by reason of the laterally disposed cutting edges 15 and 16. When the blade 4 is moved upward, the resistance of the wood, due to the angle of the grain 27 of the limb with the cutting edge 15, causes the cut 24 to be formed at an angle with the vertical. The upward and downward movements of the blade 4, on the upper and lower surfaces of the limb 23, causes the two cuts to meet in a plane on the line 24, whereby a clean cut is produced and without tearing the bark on the trunk of the tree, indicated at 28.

It should be stated that, by reason of the cutting edges 15 and 16 being located in a plane that is inclined to the opposite faces 17 and 18, the blade 4 has a natural tendency to form the inclined cutting surface 24 close to the trunk of the tree. In other words, the surfaces 19 and 21, at the top, operate to force the blade 4 away from the trunk and the surfaces 20 and 22 operate to force the blade 4 towards the trunk. The resulting effect is to produce the finished surface 24, since the two cuts will meet on this line.

What I claim is:—

1. A pruning tool blade having flat, parallel side faces and formed with equal concave recesses in opposite edges thereof, said recesses having a common bisecting center line, the edge of each of said recesses being ground to form a cutting edge, said cutting edges being located on opposite sides of a plane parallel to and centered between said flat side faces and approximately midway between said plane and a face of said blade.

2. A pruning implement comprising, a flat blade formed with inwardly extending V-shaped top and bottom edges, said edges being ground inwardly from each face of said blade to form cutting edges, the ground surfaces on each side of each cutting edge being unequal and oppositely disposed, whereby a plane passing through the top and bottom cutting edges will be at an angle to the surfaces of the flat blade, and a pair of sockets formed on a side edge of said flat blade to receive a handle.

JOSEPH HARRY RICH.